United States Patent
Ichihara

(10) Patent No.: US 11,553,135 B2
(45) Date of Patent: Jan. 10, 2023

(54) DISPLAY CONTROL APPARATUS INCLUDING AN EYE APPROACH DETECTOR AND A SIGHTLINE DETECTOR AND A CONTROL METHOD FOR STARTING IMAGE DISPLAY

(71) Applicant: CANON KABUSHIKI KAISHA, Tokyo (JP)

(72) Inventor: Atsushi Ichihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 232 days.

(21) Appl. No.: 16/915,713

(22) Filed: Jun. 29, 2020

(65) Prior Publication Data

US 2021/0006723 A1    Jan. 7, 2021

(30) Foreign Application Priority Data

Jul. 3, 2019    (JP) .............................. JP2019-124752

(51) Int. Cl.
*H04N 5/232*    (2006.01)
*G06F 3/01*    (2006.01)
*G06F 3/041*    (2006.01)

(52) U.S. Cl.
CPC ......... *H04N 5/23293* (2013.01); *G06F 3/013* (2013.01); *H04N 5/23216* (2013.01); *H04N 5/232411* (2018.08); *G06F 3/041* (2013.01)

(58) Field of Classification Search
CPC ......... H04N 5/23293; H04N 5/232411; H04N 5/23219; H04N 5/22525; G06F 3/013; G03B 2213/025
See application file for complete search history.

(56) References Cited

U.S. PATENT DOCUMENTS

| | | | |
|---|---|---|---|
| 5,606,390 A | 2/1997 | Arai | |
| 9,369,633 B2* | 6/2016 | Kobayashi | ....... H04N 5/232941 |
| 9,544,462 B2* | 1/2017 | Maruyama | ....... H04N 5/232933 |
| 9,936,137 B2* | 4/2018 | Wada | .................. H04N 5/23293 |
| 11,108,945 B2* | 8/2021 | Ichikawa | ................ G06F 3/013 |
| 2008/0170150 A1* | 7/2008 | Kojima | .............. H04N 5/23293 |
| | | | 348/E5.025 |
| 2014/0293109 A1 | 10/2014 | Kobayashi | |
| 2015/0358497 A1 | 12/2015 | Maruyama | |
| 2016/0227122 A1* | 8/2016 | Wada | ................. H04N 5/23245 |

(Continued)

FOREIGN PATENT DOCUMENTS

| | | |
|---|---|---|
| CN | 103248802 A | 8/2013 |
| CN | 109391766 A | 2/2019 |

(Continued)

*Primary Examiner* — John Villecco
(74) *Attorney, Agent, or Firm* — Canon U.S.A., Inc. I.P. Division

(57) ABSTRACT

A display control apparatus comprises a first display unit capable of being viewed via an eyepiece part, a second display unit capable of being viewed without the eyepiece part, an eye approach detection unit configured to detect an eye approaching to the eyepiece part, a sight line detection unit configured to detect a sight line of the eye that is viewing the first display unit via the eyepiece part, and a control unit configured to perform control to stop display of the first display unit if a sight line is not detected by the sight line detection unit within a first time period in a state where the eye approaching is being detected by the eye approach detection unit.

14 Claims, 9 Drawing Sheets

(56) References Cited

U.S. PATENT DOCUMENTS

| | | | |
|---|---|---|---|
| 2017/0353659 A1 | 12/2017 | Hoshina | |
| 2019/0045134 A1* | 2/2019 | Oyama | |
| 2020/0106938 A1* | 4/2020 | Nakashima | ........ H04N 5/22525 |
| 2020/0336665 A1* | 10/2020 | Matsui | ............. H04N 5/232939 |
| 2020/0393898 A1* | 12/2020 | Ichikawa | ................ G03B 13/02 |
| 2021/0241766 A1* | 8/2021 | Ueno | ...................... G06F 3/167 |

FOREIGN PATENT DOCUMENTS

| | | | | |
|---|---|---|---|---|
| JP | H05191686 A | * | 7/1993 | |
| JP | H07-203257 A | | 8/1995 | |
| JP | H1096849 A | * | 4/1998 | |
| JP | 11326747 A | * | 11/1999 | |
| JP | 2005223516 A | * | 8/2005 | ......... H04N 5/23241 |
| JP | 2005229255 A | * | 8/2005 | |
| JP | 2017-120272 A | | 7/2017 | |
| JP | 2017120272 A | * | 7/2017 | |
| KR | 20160029438 A | * | 3/2016 | |

* cited by examiner

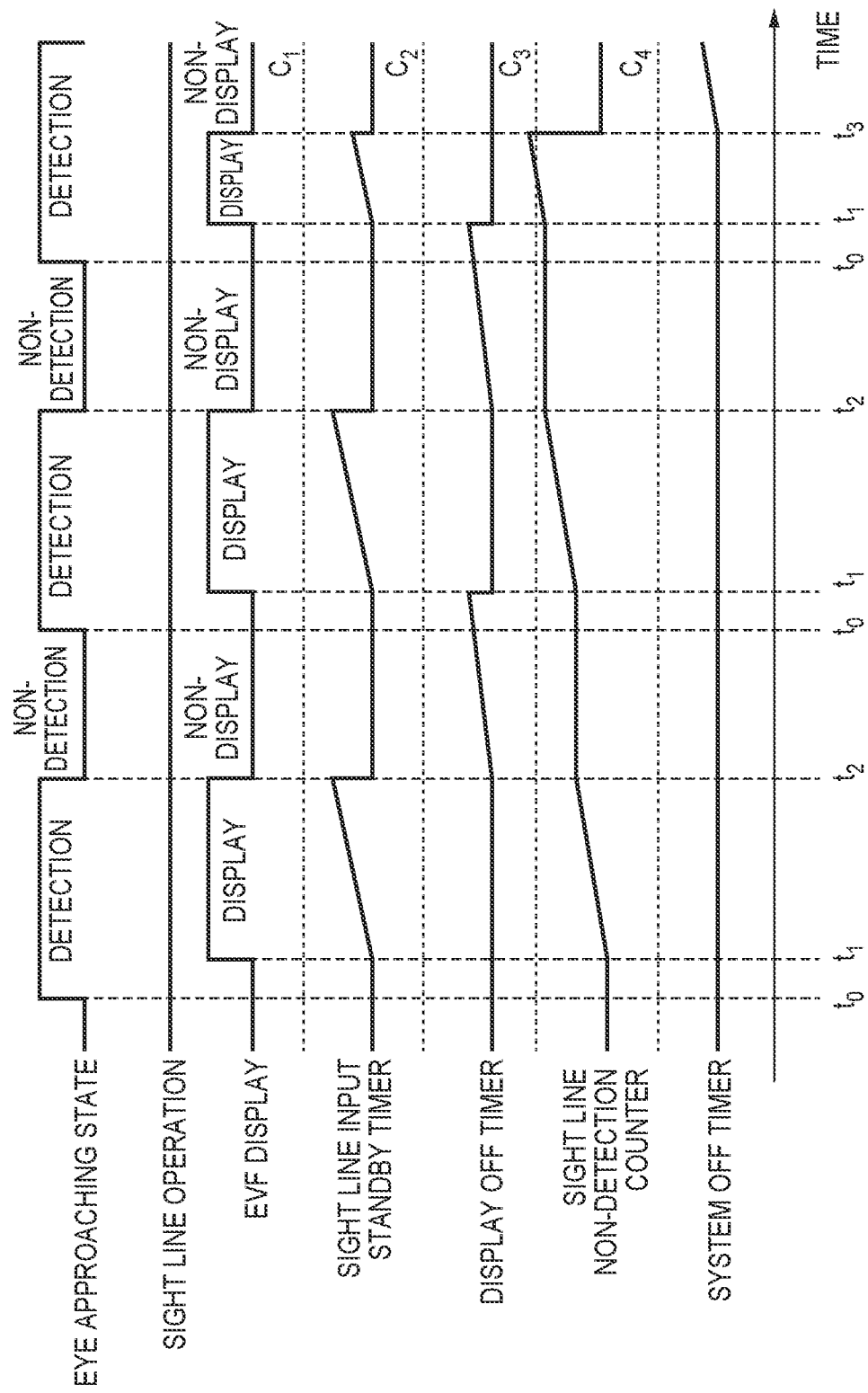

DISPLAY CONTROL APPARATUS INCLUDING AN EYE APPROACH DETECTOR AND A SIGHTLINE DETECTOR AND A CONTROL METHOD FOR STARTING IMAGE DISPLAY

BACKGROUND

Field of the Disclosure

The present disclosure relates to a display control technique in accordance with a sight line input.

Description of the Related Art

In recent years, techniques for incorporating a sight line input function in an image capture apparatus such as a digital camera, detecting a sight line of a user, and performing AF control or AE control targeted on a region that they are gazing at have been proposed.

Japanese Patent Laid-Open No. 7-203257 discloses switching to a moving image recording standby state if eye approaching to a viewfinder is detected, but switching to a power save mode if there is no operation for a certain time period. Japanese Patent Laid-Open No. 2017-120272 discloses providing a sight line detection unit near a backside display, and stopping a power supply of an eye approach detection unit of a viewfinder when a sight line in relation to the backside display is detected.

In Japanese Patent Laid-Open No. 7-203257, if there is no operation for a certain time period after eye approach detection, the electronic viewfinder continues to operate for a time period until there is a transition to a power save mode. In addition, a user may be carrying a digital camera in a state in which it is strung from their neck or shoulder, but, in Japanese Patent Laid-Open No. 2017-120272, because an eye approach detection operation is continued and sight line detection by a backside display cannot be performed, it may not be possible to achieve a power saving effect.

SUMMARY

An aspect of the present disclosure includes consideration of the aforementioned situation, and realizes techniques that enable an eye approach detection function and a sight line detection function to be used to appropriately control display of an EVF or a display unit, and achieve a high power-saving effect.

The present disclosure provides a display control apparatus comprising: a first display unit capable of being viewed via an eyepiece part; a second display unit capable of being viewed without the eyepiece part; an eye approach detection unit configured to detect an eye approaching to the eyepiece part; a sight line detection unit configured to detect a sight line of the eye that is viewing the first display unit via the eyepiece part; and a control unit configured to perform control to stop display of the first display unit if a sight line is not detected by the sight line detection unit within a first time period in a state where the eye approaching is being detected by the eye approach detection unit.

Further features of the present disclosure will become apparent from the following description of exemplary embodiments (with reference to the attached drawings).

BRIEF DESCRIPTION OF THE DRAWINGS

FIGS. 6A and 6B are timing charts illustrating relationships between operations of each component of the second embodiment.

DESCRIPTION OF THE EMBODIMENTS

Figure 1A:
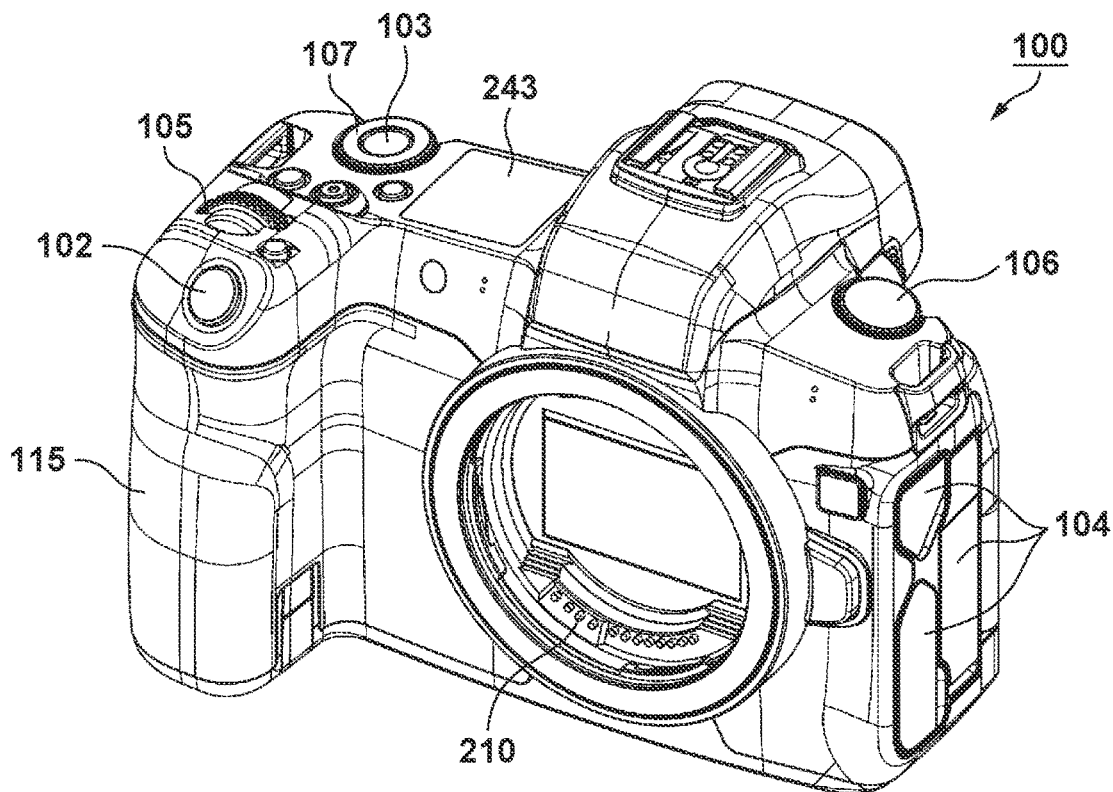
FIG. 1A is a front perspective view of an apparatus of first and second embodiments.

Hereinafter, embodiments will be described in detail with reference to the attached drawings. Note, the following embodiments are not intended to limit the scope of the claimed disclosure. Multiple features are described in the embodiments, but limitation is not made that requires all such features, and multiple such features may be combined as appropriate. Furthermore, in the attached drawings, the same reference numerals are given to the same or similar configurations, and redundant description thereof is omitted.

First Embodiment

Hereinafter, embodiments in which a display control apparatus of the present disclosure is applied to a digital camera which is an image capture apparatus capable of shooting a still image and/or a moving image will be described in detail with reference to the accompanying drawings.

<Apparatus Configuration>

The configuration and functions of digital camera 100 according to the present embodiment will be described below with reference to FIGS. 1A, 1B and 2.

Figure 1B:
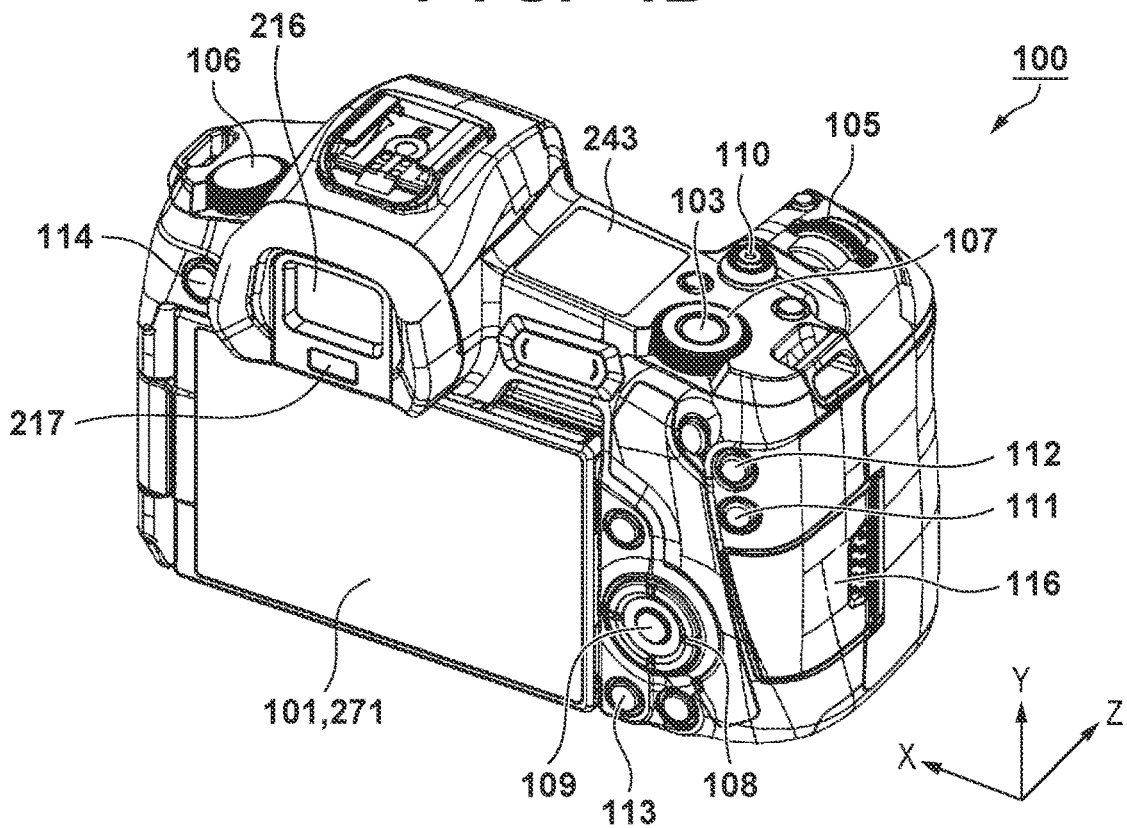
FIG. 1B is a back perspective view of the apparatus of the first and second embodiments.

FIG. 1A is a front perspective view of the digital camera 100, and FIG. 1B is a back perspective view of the digital camera 100.

In FIGS. 1A and 1B, a backside display unit 101 is a display device, such as a liquid crystal panel or an organic EL panel, provided on the back surface of the camera body, for displaying images and various types of information so that a user can visually recognize them. Moreover, the backside display unit 101 has a function of reproducing a still image after the still image was shot, a function of displaying a moving image that is being recorded, and a live view display (through-the-lens display) function as well. An out-of-finder display unit 243 is a display device such as an LCD provided on the upper surface of the camera body, and displays various setting values of the camera such as a shutter speed and a diaphragm aperture.

A shutter-release button 102 is a push button type operation member for giving a shooting instruction. A mode selection switch 103 is a dial type operation member for switching between various modes. The mode selection switch 103 switches the operation mode of a system control unit 201 to any of a still image shooting mode, a moving image recording mode, and a reproduction mode. The still image shooting mode includes an automatic shooting mode, an automatic scene determination mode, a manual mode, aperture-priority AE mode (Av mode), shutter-priority AE mode (Tv mode), program AE mode (P mode), for example.

The still image shooting mode also includes various scene modes for which a scene-specific shooting setting is made, custom mode, and the like.

Using the mode selection switch 103, the mode is directly switched to any of the plurality of modes included in the still image shooting mode. Alternatively, it is also possible to switch, using the mode selection switch 103, to the still image shooting mode and then to switch, using another operation member, to any of the plurality of modes included in the still image shooting mode. Similarly, the moving image recording mode and the reproduction mode may include a plurality of modes.

A terminal cover 104 is a cover member for protecting a connector (not illustrated) for connecting an external device and the digital camera 100 via a cable such as a USB cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for the switching on/off of the power supply to the digital camera 100. A sub electronic dial 107 is a rotating operation member that can move a selected frame, scroll images, and the like. A cross key 108 is a movement instruction member that can perform, by one of four-directional buttons constituted by UP, DOWN, LEFT and RIGHT being pressed down, an operation that corresponds to the pressed portion of the cross key 108. A SET button 109 is a push button type operation member that is mainly used for determining a selection item. A moving image recording button 110 is a push button type operation member that is used for switching on/off of the live view display in the still image shooting mode and for starting or stopping the moving image shooting (recording) in the moving image recording mode. An enlargement button 111 is a push button type operation member that is used for turning on/off of the enlargement display during the live view and for changing the enlargement ratio during the enlargement display. Further, the enlargement button 111 is used for enlarging a reproduced image in a reproduction mode and increasing a magnification ratio. By operating the main electronic dial 105 after turning on of the enlarged display, the live view image can be enlarged or reduced. In the reproduction mode, the reproduced image is enlarged, and the main electronic dial 105 functions as an enlargement button for increasing an enlargement ratio. The AE lock button 112 is a push button type operation member that can fix an exposure state by being pressed in a shooting standby state. The reproduction button 113 is a push-button type operation member that is used to switch between the shooting mode and the reproduction mode. By pressing the reproduction button 113 during the shooting mode, the operation mode is switched to the reproduction mode, and the latest image among the images recorded on the recording medium 250 can be displayed on the backside display unit 101. The menu button 114 is a push button type operation member for displaying a menu screen on which various settings can be made on the backside display unit 101 when pressed. The user can intuitively perform various settings using the menu screen displayed on the backside display unit 101, the cross key 108, and the SET button 109.

The display of the backside display unit 101 and the EVF 229 described later are controlled by the system control unit 201 in accordance with the various operation modes described above. An eyepiece part 216 is a look-through type eyepiece finder. The user can visually recognize an image displayed on an electronic viewfinder (hereinafter, referred to as EVF) 229 in the camera body via the eyepiece part 216, and confirm the focus and composition of the object image taken in through the lens unit 200.

An eye approach detection unit 217 is arranged near the eyepiece part 216, and can detect approach of any object to the eyepiece part 216. As the eye approach detection unit 217, for example, an infrared proximity sensor is used.

Figure 2:
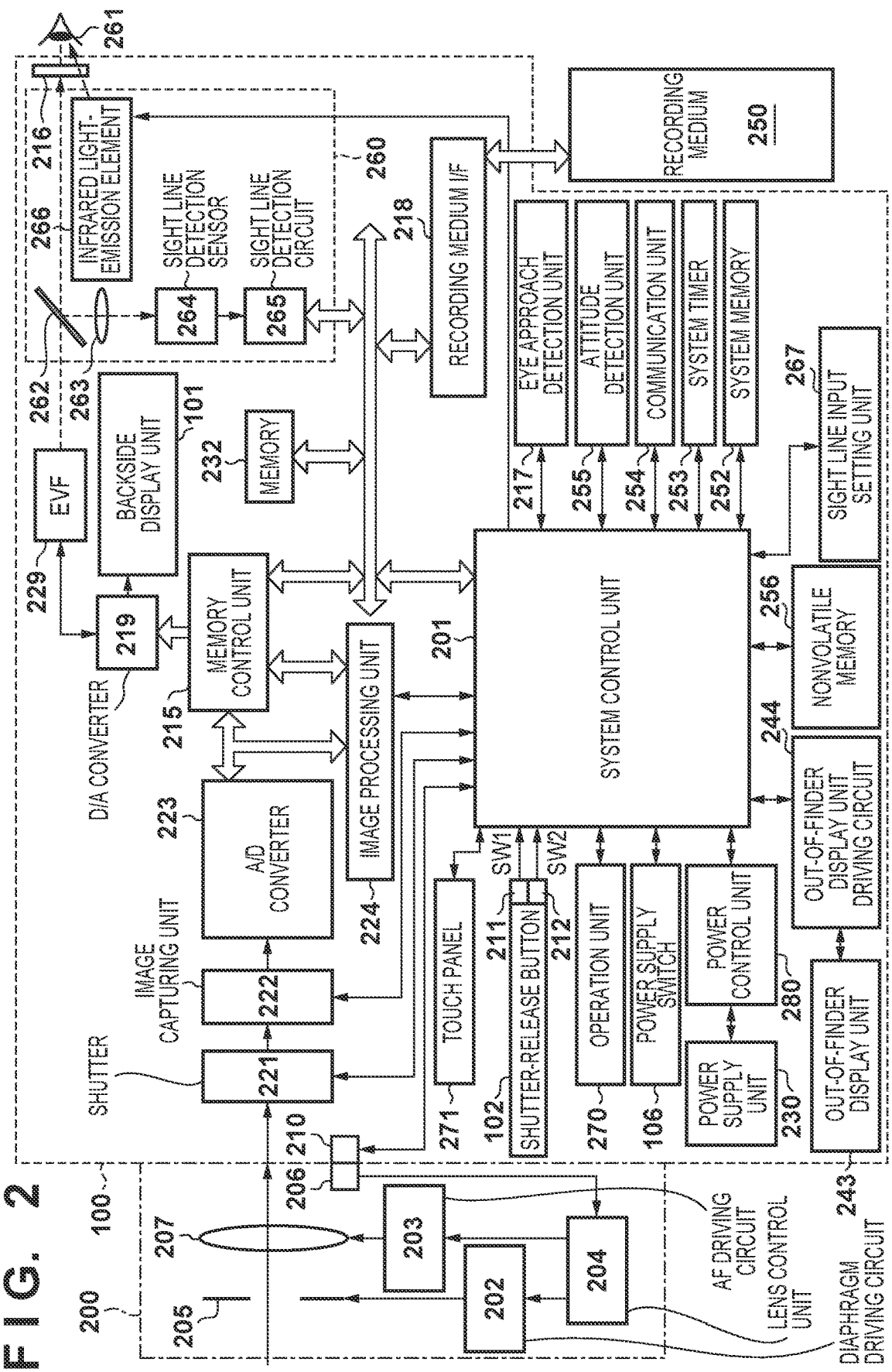
FIG. 2 is a block diagram showing an apparatus configuration of the first and second embodiments.

A communication terminal 210 is an electric contact for the digital camera 100 to perform communication with a lens unit 200 (FIG. 2). A lid 116 is a member for opening or closing a slot for mounting/removing the recording medium 250 to/from the digital camera 100. A grip 115 has a shape that makes it easy to be grasped by a user's a right hand when he or she holds the digital camera 100. The shutter button 102 and the main electronic dial 105 are arranged at positions where the grip portion 115 can be operated by the index finger of the right hand while holding the digital camera 100 by gripping the grip portion 115 with the little finger, the ring finger and the middle finger of the right hand. In the same state, the sub electronic dial 107 is arranged at a position operable with the thumb of the right hand.

Next, the internal configuration of the digital camera 100 and lens unit 200 according to the present embodiment will be described with reference to FIG. 2. In FIG. 2, configurations that are the same as in FIGS. 1A and 1B are denoted by the same reference signs. In FIG. 2, the lens unit 200 is equipped with a shooting lens 207, and is detachable from the digital camera 100.

The shooting lens 207 is usually constituted by a plurality of lenses, but is simplified here and is shown by one lens only. A communication terminal 206 is an electric contact for the lens unit 200 to perform communication with the digital camera 100. The communication terminal 210 is an electric contact for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the object image into electrical signals. A/D converter 223 converts analog signals of one pixel output from the image capturing unit 222 into digital signals of, for example, 10 bits.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results.

Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results.

A memory control unit 215 controls to exchange data between the A/D converter 223, the image processing unit 224, and the memory 232. The digital data from the A/D converter 223 is directly written into a memory 232 via both the image processing unit 224 and the memory control unit 215 or via the memory control unit 215. The memory 232 stores the image data obtained from the image capturing unit 222 and the A/D converter 223, and image display data to be displayed on the backside display unit 101 or the EVF 229. The memory 232 has a storage capacity that is sufficient for storing a predetermined number of still images as well as moving images and audio for a predetermined time period. The memory 232 also functions as a memory for image display (video memory).

A D/A converter 219 converts the image display data stored in the memory 232 into an analog signal and supplies the backside display unit 101 or the EVF 229 with the analog signal. The image display data that was written into the memory 232 is displayed by the backside display unit 101 or the EVF 229 via the D/A converter 219. The backside display unit 101 and the EVF 229 perform display in accordance with the analog signal from the D/A converter 219. In this manner, the digital signals stored in the memory 232 are converted into analog signals, and the analog signals are successively transmitted to the backside display unit 101 or the EVF 229 so as to be displayed thereon, making it possible to perform live view (LV) display (through image display).

Various setting values of the camera such as a shutter speed and a diaphragm aperture are displayed on the out-of-finder display unit 243 via an out-of-finder display unit driving circuit 244.

A nonvolatile memory 256 is, for example, an EEPROM, which is electrically erasable and recordable. In the nonvolatile memory 256, constants and programs, for example, for operating the system control unit 201 are stored. In this context, "programs" may refer to programs for executing various flowcharts that will be described later.

The system control unit 201 has a CPU (Central Processing Unit or a MPU (Micro Processing Unit) for overall controlling of the entire digital camera 100, and realizes, by executing the programs stored in the nonvolatile memory 256, the procedures of the flowchart that will be described later. The system memory 252 is, for example, a RAM and used also as a working memory where constants and variables for operating the system control unit 201, and the programs read out from the nonvolatile memory 256 are expanded. The system control unit 201 controls the memory 232, the D/A converter 219, the backside display unit 101, the EVF 229, and the like, so as to perform display control. A system timer 253 is a time measurement unit for measuring time periods for various types of controls and the time of an integrated clock.

The first shutter switch 211 and the second shutter switch 212 input the following operation instructions to the system control unit 201.

While the shutter-release button 102 provided on the digital camera 100 is being operated, that is, pressed halfway (the shooting preparation instruction), the first shutter switch 211 is turned on and generates a first shutter switch signal SW1. Upon receiving the first shutter switch signal SW1, the system control unit 201 causes the image processing unit 224 to start the AF processing, the AE processing, the AWB processing, the EF processing and the like.

When the operation of the shutter-release button 102 is completed, that is, the shutter-release button 102 is pressed fully (the shooting instruction), the second shutter switch 212 is turned on and generates a second shutter switch signal SW2. Upon receiving the second shutter switch signal SW2, the system control unit 201 starts a series of shooting processing from reading out the signal from the image capturing unit 222 to writing of image data to the recording medium 250.

The operation units 270 comprise operation members such as various switches and buttons for accepting various operations from a user, and communicating them to the system control unit 201, and include at least the following operation members: the shutter-release button 102, the mode selection switch 103, the main electronic dial 105, the power supply switch 106, the sub electronic dial 107, the cross key 108, the SET button 109, the moving image recording button 110, the enlargement button 111, the AE lock button 112, the reproduction button 113, and the menu button 114. In addition, the operation units 270 also include operation members for performing the following operations: settings such as a shooting mode, a continuous shooting mode, set, macro, page-forwarding, flash, menu movement, white balance, shooting quality selection, exposure correction, date/time, shutter speed, the aperture value, and exposure; turning image display on and off; turning on a quick review that automatically reproduces a shot image immediately after shooting on or off; and deleting a reproduced image. In addition, the operation unit 270 includes a recording mode switch for selecting between a compressed recording mode for recording an image capture signal compressed by JPEG, MPEG, or the like and a RAW recording mode for converting an image capture signal to a digital signal and recording it as is, and an AF mode switching switch. AF modes include a one-shot AF mode for fixing focus to a predetermined region in a half-press state of the shutter-release button 102, and a tracking (servo) AF mode for continuing to align the focus to a predetermined subject. In addition, it is possible to automatically switch these AF modes (AI focus AF).

A power control unit 280 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each of the units including the recording medium 250.

A power supply unit 230 comprises a primary battery such as an alkaline battery or a lithium battery, a secondary battery such as a NiCd battery, a NiMH battery, or a Li-ion battery, or an AC adaptor. A recording medium interface (I/F) 218 is for interfacing with the recording medium 250 such as a memory card or a hard disk drive. The recording medium 250 is a recording medium such as a memory card for recording shot images, and constituted by a semiconductor memory, a magnetic disk, or the like.

The communication unit 254 is connected by a wireless antenna or a cable, and transmits and receives a video signal, an audio signal, and the like. The communication unit 254 can also connect to a wireless LAN (Local Area Network) and the Internet. The communication unit 254 can transmit image data (including a live view image) captured by the image capturing unit 222 and an image file recorded on the recording medium 250 to an external device, and can receive image data or other various information from the external device. Note that the communication unit 254 is not limited to a wireless LAN, but may use a wireless communication module such as an infrared communication, Bluetooth®, Bluetooth® Low Energy or Wireless USB, or a wired connection such as a USB cable, HDMI®, IEEE 1394, or the like.

An attitude detection unit 255 detects the attitude (orientation) of the digital camera 100 with respect to the gravity direction. In this case, based on the attitude detected by the attitude detection unit 255, it is possible to discriminate whether an image captured by the image capturing unit 222 has been shot by setting the digital camera 100 in the landscape or portrait direction. The system control unit 201 can add information about the orientation information corresponding to the attitude detected by the attitude detection unit 255 to the image file, and rotate and record the captured image. An acceleration sensor, gyro sensor and the like may be used as an attitude detection unit 255. The attitude detection unit 255 can also detect the movement (pan, tilt, lift, rest, etc.) of the digital camera 100 by using the acceleration sensor or the gyro sensor.

Included among the operation units 270 is also a touch panel (touch screen) 271 that is capable of detecting a touch operation on the backside display unit 101. The touch panel 271 and the backside display unit 101 can be constructed as a single integrated unit. For example, the touch panel 271 is constructed in such a manner that the transmittance of light will not interfere with the display presented by the backside display unit 101, and it is attached to the uppermost layer of the display face of the backside display unit 101. In addition, input coordinates on the touch panel 271 and display coordinates on the backside display unit 101 are correlated. As a result, a GUI can be constructed that makes it possible for the user to directly manipulate the screen displayed on the backside display unit 101.

The touch panel 271 may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

<Eye Approach Detection>

An eye approach detection unit 217 detects whether an eye (an object) has approached (eye approaching) or has moved away from (eye separation) the eyepiece part 216 (approach detection). The system control unit 201 switches the backside display unit 101 and the EVF 229 between displaying (a display state)/not displaying (a non-display state) in accordance with the state detected by the eye approach detection unit 217. The system control unit 201 sets a display destination as the backside display unit 101 and sets the EVF 229 to be not displaying during non-eye approach detection at least in a case where the shooting mode and the switching of the display destination are automatic. Further, the system control unit 201 sets the display destination as the EVF 229 and sets the backside display unit 101 to be not displaying during eye approach detection.

If an object has approached, infrared light irradiated from a light emitting unit (not illustrated) of the eye approach detection unit 217 is reflected and incident on a light receiving unit (not illustrated) of the infrared proximity sensor. In accordance with an incident light amount of the infrared light received by the infrared proximity sensor, it is possible to detect an approach of some kind of physical object to the eyepiece part 216, and discriminate to what level of distance the object has gotten close to the eyepiece part 216 (an eye approaching distance). Upon detecting an approach of an object to the eyepiece part 216, the system control unit 201 can cause display of the EVF 229 to start. With this, it is possible for the EVF 229 to display without delay as much as possible when a user looks through the eyepiece part 216.

In addition, upon detecting that an object has approached within a predetermined distance with respect to the eyepiece part 216 from eye non-proximate state (no approach state), the eye approach detection unit 217 determines that an eye approaching is detected and transmits an eye approach detection notification to the system control unit 201. In addition, if an object for which an approach was detected is apart by the predetermined distance or more from an eye approaching state (approach state), the eye approach detection unit 217 determines that eye separation is detected, and an eye separation detection notification is transmitted to the system control unit 201. A threshold for detecting eye approaching and a threshold for detecting eye separation may be made different such as by providing hysteresis for example. In addition, it is assumed that, after eye approaching is detected, there is an eye approaching state until eye separation is detected. In addition, it is assumed that, after eye separation is detected, there is an eye non-approaching state until eye approaching is detected. With this, the system control unit 201 performs display control of the backside display unit 101 and the EVF 229 in response to an eye approaching state or an eye separation state detected by the eye approach detection unit 217. Details of the display control will be described later.

Note that the eye approach detection unit 217 is not limited to an infrared proximity sensor, and another sensor may be used if it can detect an approach of an object or an eye to be deemed as an eye approaching.

<Sight-Line Detection>

The sight-line detection unit 260 includes a dichroic mirror 262, an image forming lens 263, a sight line detection sensor 264, a sight line detection circuit 265, and an infrared light-emission element 266 which follow, and detects whether or not there is a sight line of a user and also detects movement or a position of the sight line.

The infrared light-emission element 266 is a diode for emitting an infrared light for detecting a sight-line position of a user in a viewfinder screen, and irradiates the infrared light onto an eye 261 of a user. The infrared light irradiated from the infrared light-emission element 266 is reflected by the eye 261, and the reflected infrared light reaches the dichroic mirror 262. The dichroic mirror 262 has a function for reflecting on infrared light and allowing visible light to pass, and the reflected infrared light whose light path has been changed forms an image on an image capture plane of the sight line detection sensor 264 via the image forming lens 263.

The image forming lens 263 is an optical member that configures a sight line detection optical system. The sight line detection sensor 264 includes an image sensor that uses a CCD, CMOS, or the like. The sight line detection sensor 264 photoelectrically converts incident reflected infrared light into an electric signal, and outputs the electric signal to the sight line detection circuit 265. Based on the output signal from the sight line detection sensor 264, the sight line detection circuit 265 detects a sight-line position of a user from a position of a pupil or movement of the eye 261 of the user, and outputs detected information to the system control unit 201. The sight line detection sensor 264 can detect a pupil of an eye of a person, and thus, even if another object approaches or touches the eyepiece part 216, the sight line detection sensor 264 does not detect that a sight line of a person has been inputted. By this, the eyepiece part 216 has a function as a sight line operation unit, but the sight-line detection unit may be another configuration.

Note that the eye approach detection unit 217 is intended to detect an approach of an object, and thus determines whether there is an eye approaching in accordance with a reflected light amount of infrared light. In addition, the system control unit 201 needs to cause display of the EVF 229 to start as quickly as possible when a user has looked through the eyepiece part 216. Accordingly, it is necessary to increase a distance for eye approach detection, but this makes misdetection such as an approach of something other than the face of a user more likely to occur.

The sight-line detection unit 260 is intended to detect a sight-line position of a user with respect to the EVF 229 which is in the eyepiece part 216. Because there is a need to detect a sight-line position when a user is looking, it has a configuration that also includes an optical system for forming an image on the image capture plane of the sight line detection sensor 264 when an eye of a user has gotten sufficiently close to the eyepiece part 216. Accordingly, detection accuracy for the sight-line position increases when a user is looking through the eyepiece part 216, but a detection distance for the sight-line position is sufficiently shorter than the detection distance for eye approaching.

In addition, if a state where the sight line of a user is fixed to a certain region continues for a predetermined time period based on sight line detection results received from the sight line detection circuit 265, the system control unit 201 determines that this region is being gazed at. Note that a predetermined threshold can be changed as appropriate.

With a sight line input setting unit 267, a user can set enabled or disabled for sight line detection in accordance with the sight line detection circuit 265, or set enabled or disabled of processing in response to a sight line operation by the system control unit 201. These settings are items that a user can set on a menu screen, for example. The system control unit 201 is capable of determining the following states and operations with respect to the eyepiece part 216:

An eye is sufficiently close to the eyepiece part 216 and sight line detection has started. (start of sight line input).

Being in the state of ongoing sight line inputting to the eyepiece part 216.

Being in the state where a region of the eyepiece part 216 is being gazed at;

That the eye for which sight line detection processing was ongoing has been removed from the eyepiece part 216 (end of sight line input).

Being in the state where no sight line detection processing is being inputted to the eyepiece part 216.

These operations/states and an input position of a sight line for the eyepiece part 216 are notified to the system control unit 201, and the system control unit 201 can determine what kind of operation (sight line operation) has been performed for the eyepiece part 216 based on the notified information.

<Display Control Processing>

Next, with reference to FIGS. 3A, 3B, 4A and 4B, description is given regarding processing for using the eye approach detection function and the sight line detection function to control the EVF 229 or the backside display unit 101, in the first embodiment.

Figure 3A:
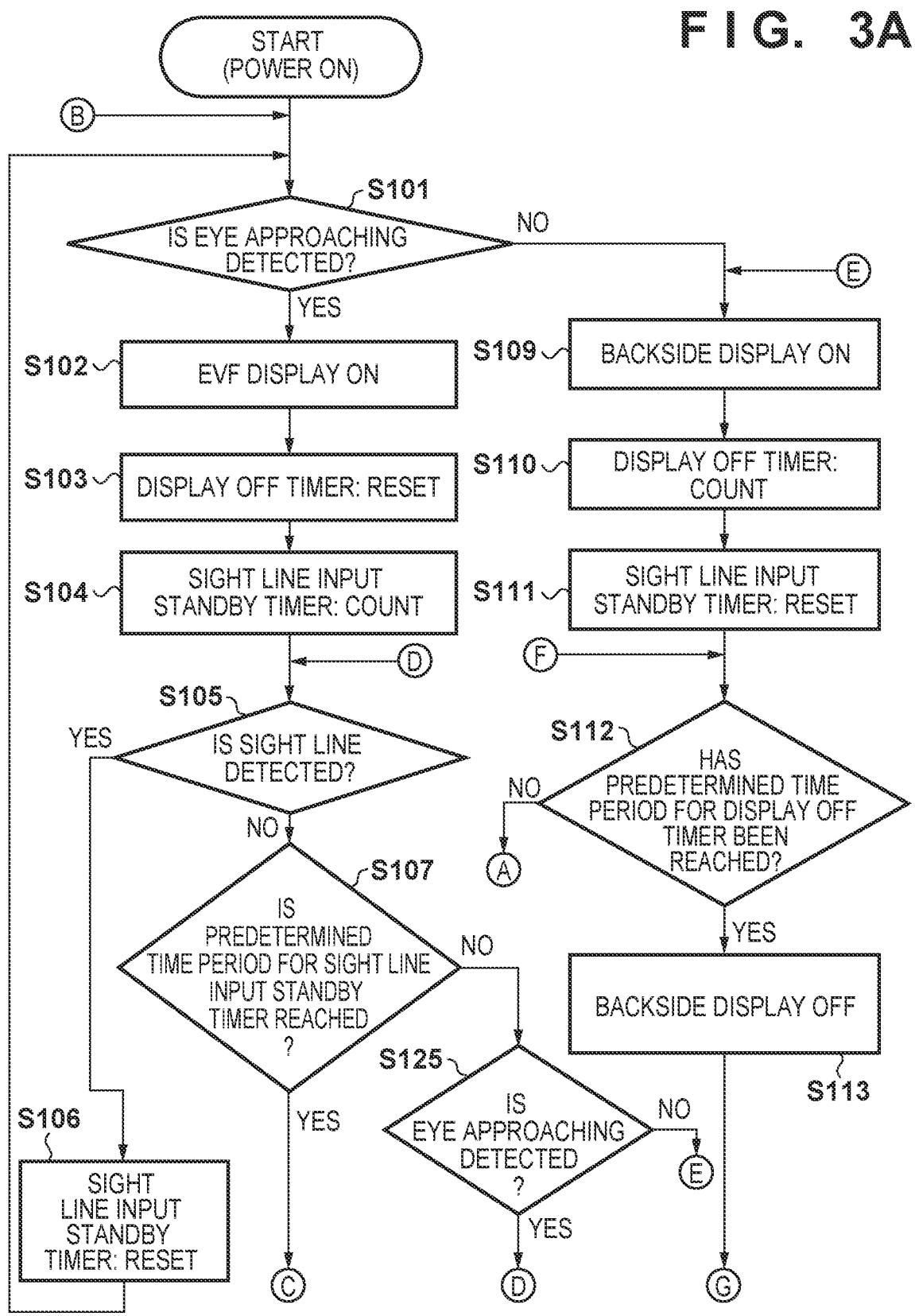
FIGS. 3A and 3B are flowcharts illustrating display control processing of the first embodiment.
Figure 3B:
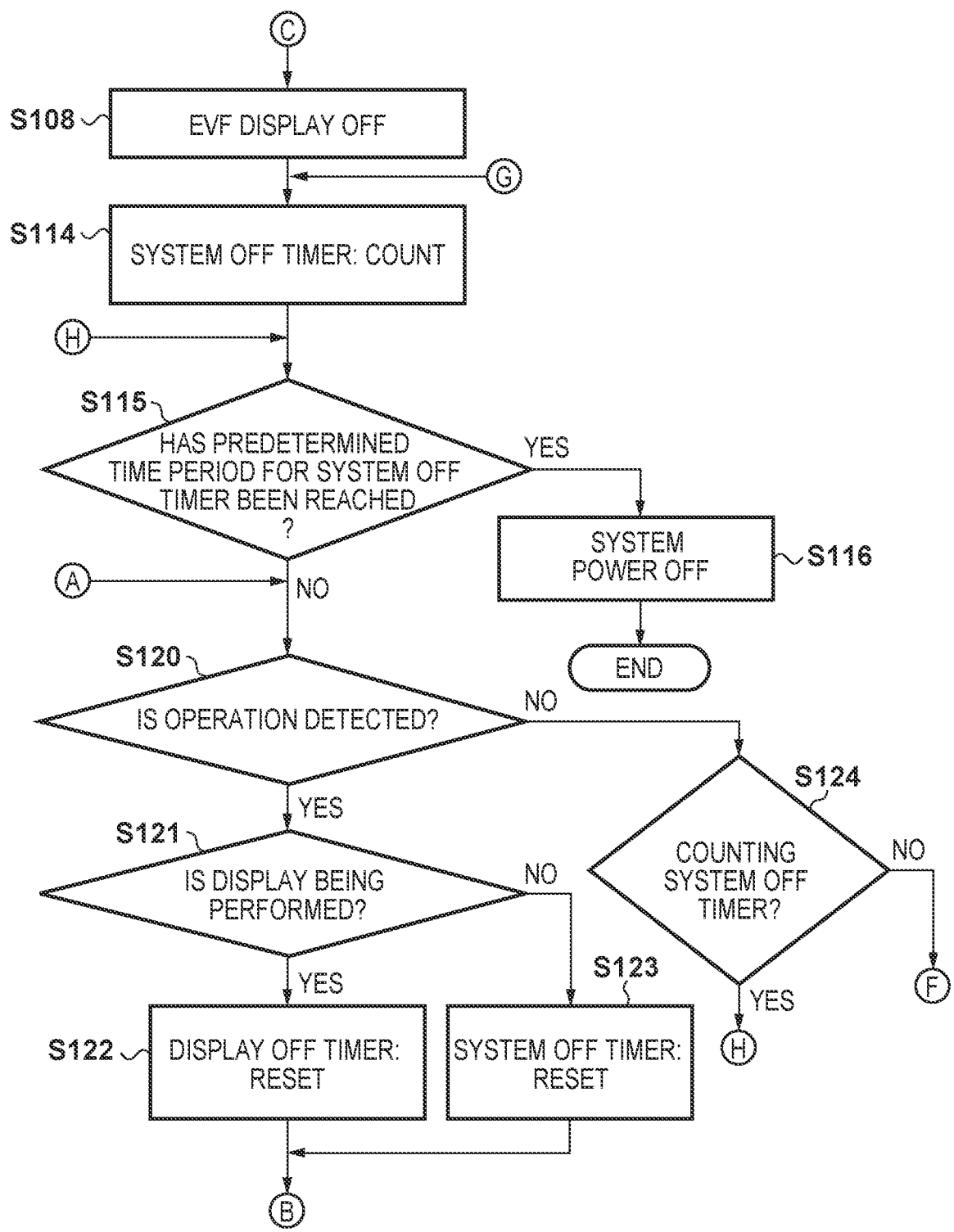

FIGS. 3A and 3B are flowcharts illustrating processing for using the eye approach detection function and the sight line detection function to control the EVF 229 or the backside display unit 101, in the first embodiment.

The processing of FIGS. 3A and 3B is realized by the power supply of the digital camera 100 being turned on, and the system control unit 201 loading a program stored in the nonvolatile memory 256 into the system memory 252, and executing the program to control each functional block. It is similar to processing illustrated in FIGS. 5A and 5B which is described later.

In step S101, the system control unit 201 determines whether an eye approach detection notification has been received from the eye approach detection unit 217. If an eye approaching is detected, the processing proceeds to step S102, and if an eye approaching is not detected, the processing proceeds to step S109.

In step S102, the system control unit 201 activates the EVF 229, transmits display data, and causes the EVF 229 to display the display data. If the backside display unit 101 was being displayed, the system control unit 201 stops transmission of display data to the backside display unit 101, and stops supply of power to the backside display unit 101 to thereby stop display of the backside display unit 101.

In step S103, the system control unit 201 resets a display off timer. The display off timer is a timer for measuring (counting) a time period (count value) during which an unoperated state where a user does not perform a user operation, a touch operation, or the like with respect to the operation unit 270 or the touch panel 271 while the backside display unit 101 is being displayed continues. If the unoperated state continues for a predetermined time period, transmission of display data to the backside display unit 101 and supply of power to the backside display unit 101 are stopped to thereby suppress power consumed by the digital camera 100.

In step S104, the system control unit 201 begins incrementing a count value of a sight line input standby timer. The sight line input standby timer is a timer for measuring (counting) a time period (count value) until reception of a sight line detection notification from the sight-line detection unit 260 during display by the EVF 229 occurs. If a state where a sight line is not detected (a sight line detection notification is not received) continues for a predetermined time period, the transmission of display data to the EVF 229 and supply of power to the EVF 229 are stopped to thereby suppress power consumed by the digital camera 100.

In step S105, the system control unit 201 determines whether a sight line detection notification has been received from the sight-line detection unit 260 after causing the EVF 229 to display, and if a sight line is detected the processing proceeds to step S106, and if a sight line is not detected, the processing proceeds to step S107.

In step S106, the system control unit 201 resets the sight line input standby timer.

In step S107, the system control unit 201 determines whether the count value of the sight line input standby timer for which counting started in step S104 has exceeded a predetermined threshold. If the count value of the sight line input standby timer exceeds the predetermined threshold, it is determined that a user is not looking through the EVF 229 and the processing proceeds to step S108, and if the count value does not exceed the predetermined threshold, the processing proceeds to step S125.

In step S108, the system control unit 201 stops transmission of display data to the EVF 229 and supply of power to the EVF 229 to thereby stop display of the EVF 229.

In step S125, the system control unit 201 determines whether an eye approach detection notification has been received from the eye approach detection unit 217. If an eye approaching is detected, the processing proceeds to step S105, and if an eye approaching is not detected, the processing proceeds to step S109.

In step S109, the system control unit 201 activates the backside display unit 101, transmits display data, and causes the backside display unit 101 to display the display data. If the EVF 229 was being displayed, the system control unit 201 stops transmission of display data to the EVF 229 and supply of power to the EVF 229 to thereby stop display of the EVF 229.

In step S110, the system control unit 201 increments a count value of a display off timer.

In step S111, the system control unit 201 resets the count value of a sight line input standby timer.

In step S12, the system control unit 201 determines whether the count value of the display off timer for which counting started in step S110 has exceeded a predetermined threshold. If the count value of the display off timer exceeds the predetermined threshold, it is determined that a user is not performing a shooting operation of the digital camera 100 and the processing proceeds to step S113, and if the count value does not exceed the predetermined threshold, the processing proceeds to step S120.

In step S113, the system control unit 201 stops transmission of display data to the backside display unit 101 and supply of power to the backside display unit 101 to thereby stop display of the backside display unit 101.

In step S114, the system control unit 201 increments the count value of the system off timer. The system off timer is a timer for measuring a time period during which an unoperated state where a user does not perform a user operation, a touch operation, or the like with respect to the operation unit 270 or the touch panel 271 after display of the backside display unit 101 or the EVF 229 has been stopped continues. If the unoperated state continues for a predetermined time period, the system control unit 201 is caused to transition to a sleep state to thereby suppress power consumed by the digital camera 100.

In step S115, the system control unit 201 determines whether the count value of the system off timer for which counting started in step S114 has exceeded a predetermined threshold. If the count value of the system off timer exceeds the predetermined threshold, it is determined that a user is not performing shooting operation of the digital camera 100 and the processing proceeds to step S116, and if the count value does not exceed the predetermined threshold, the processing proceeds to step S120.

In step S116, the system control unit 201 ends processing by moving to a sleep state.

In step S120, the system control unit 201 determines whether an input signal is detected in accordance with the operation unit 270 or the touch panel 271 being operated, and if an input signal is detected the processing proceeds to step S121, and if an input signal is not detected the processing proceeds to step S124.

In step S121, the system control unit 201 determines whether there is a state where the backside display unit 101 is being displayed, and if the backside display unit 101 is being displayed the processing proceeds to step S122, and if the backside display unit 101 is not being displayed the processing proceeds to step S123.

In step S122, the system control unit 201 resets the count value of the display off timer, and the processing returns to step S101.

In step S123, the system control unit 201 resets the count value of the system off timer, and the processing returns to step S101.

In step S124, the system control unit 201 determines whether the system off timer is being counted, and if the system off timer is being counted the processing proceeds to step S115, and if the system off timer is not being counted the processing proceeds to step S112.

Figure 4A:
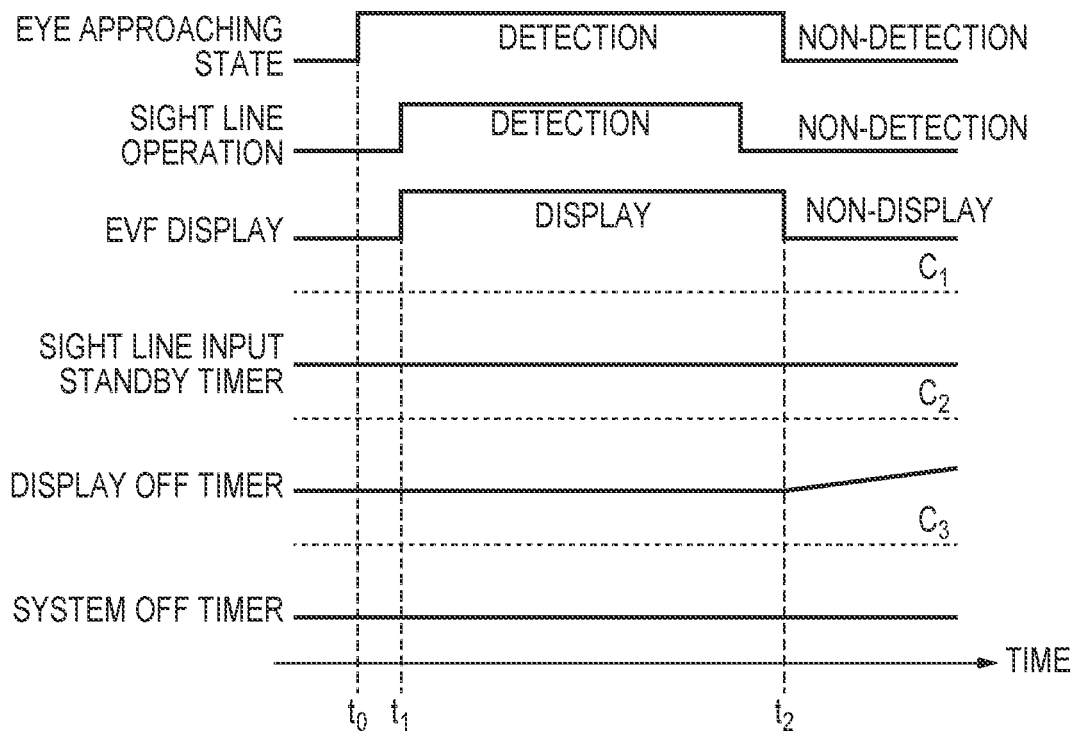
FIGS. 4A and 4B are timing charts illustrating relationship between operations of each component of the first embodiment.
Figure 4B:
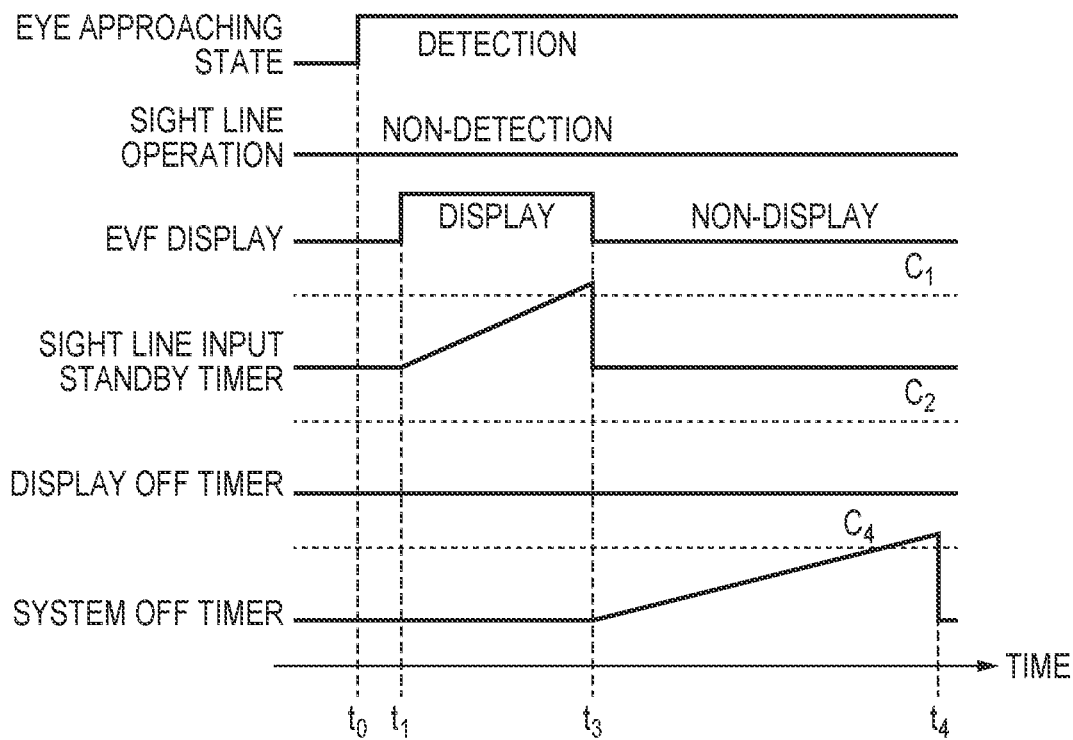

FIGS. 4A and 4B are timing charts indicating operation relationships between each unit and the EVF 229 that utilize the eye approach detection function and the sight line detection function when the processing of FIGS. 3A and 3B is executed.

FIG. 4A indicates an operation relationship of each unit and the EVF 229 when the sight-line detection unit 260 has detected a sight line, that is a user is looking through the EVF 229.

By the eye approach detection unit 217 detecting an eye approaching at time t0, at time t1 the system control unit 201 activates the EVF 229 and transmits display data to start display of the EVF 229. At this time, counting of the sight line input standby timer which is set in step S104 of FIG. 3A starts, and simultaneously the sight-line detection unit 260 is also activated to start sight line detection processing.

When a user is looking through the EVF 229 at time t1 and thereafter, the system control unit 201 receives a sight line detection notification from the sight-line detection unit 260 each predetermined time period (sight line detection processing (step S105) after detection of the eye approaching (YES in step S101)), and thus the sight line input standby timer continues to be reset.

When the user stops looking through the EVF 229 at time t2, the system control unit 201 stops display of the EVF 229, and starts display of the backside display unit 101. At this point, if the unoperated state where a user is not operating the operation unit 270 or the touch panel 271 continues, the count value of the display off timer will continue to be incremented.

FIG. 4B indicates an operation relationship of each unit and the EVF 229 when the processing of FIGS. 3A and 3B is executed in a case where the sight-line detection unit 260 was not able to detect a sight line, that is a user is not looking through the EVF 229. This is assumed to be, for example, a state where the digital camera 100 is strung from a neck with its power on.

By the eye approach detection unit 217 detecting an eye approaching at time t0, at time t1 the system control unit 201 activates the EVF 229 and transmits display data to start display of the EVF 229. At this time, counting of the sight line input standby timer which is set in step S104 of FIG. 3A starts, and simultaneously operation of the sight-line detection unit 260 is also started, but a state where a sight line cannot be detected is entered.

At time t1 and thereafter, the system control unit 201 is not receiving a sight line detection notification from the sight-line detection unit 260, and thus the count value of the sight line input standby timer continues to be incremented.

At time t3, the count value of the sight line input standby timer reaches a threshold C1 which indicates a time period for determining a state where a sight line is not detected during display of the EVF 229. At this time, the system control unit 201 determines that there is a state where a user is not looking through the EVF 229, and stops transmission of display data to the EVF 229 and supply of power to the EVF 229 to stop display to the EVF 229.

In addition, counting of the system off timer which is set in step S114 of FIG. 3B is started at time t3. If the unoperated state where a user is not operating the operation unit 270 or the touch panel 271 continues, at time t4 the system off timer reaches a threshold C4 for determining a time for the system control unit 201 to transition to a sleep state. Because of this, the system control unit 201 can transition to the sleep state.

If the sight-line detection unit 260 is not provided, it is not possible to stop display of the EVF 229 in accordance with the sight line input standby timer and thus, even if a user is not looking through the EVF 229, it is not possible to stop display of the EVF 229 if there is an approach to the eyepiece part 216 not intended by the user such as a state where the camera is hung from their neck, and power continues to be consumed.

In this manner, the digital camera 100 measures a time period in which the sight-line detection unit 260 does not detect a sight line during display of the EVF 229, and if a sight line is not detected within a predetermined time period, it is possible to determine that a user is not looking through the EVF 229. With this, it is possible to stop display of the EVF 229 in a case where a state where the EVF 229 is displayed but a user is not looking through the EVF 229 is continuing.

In addition, to suppress power consumed by the digital camera 100, there are cases where the system control unit 201 stops display of the EVF 229 if an operation with respect to the operation unit 270 or the touch panel 271 is not detected within a predetermined time period after display of the EVF 229. In the present embodiment, because it is possible to determine that a user is not looking through the EVF 229 within a shorter time period than a time period of the display being turned off, it is possible to shorten a time period until display of the EVF 229 is stopped if the sight-line detection unit 260 has not detected a sight line. With this, it is possible to suppress power consumption by the digital camera 100 if there is an approach to the eyepiece part 216 not intended by a user.

Second Embodiment

Next, with reference to FIGS. 5A, 5B, 6A and 6B, description is given regarding processing for using the eye approach detection function and the sight line detection function to control the EVF 229 or the backside display unit 101, in accordance with a second embodiment.

Figure 5A:
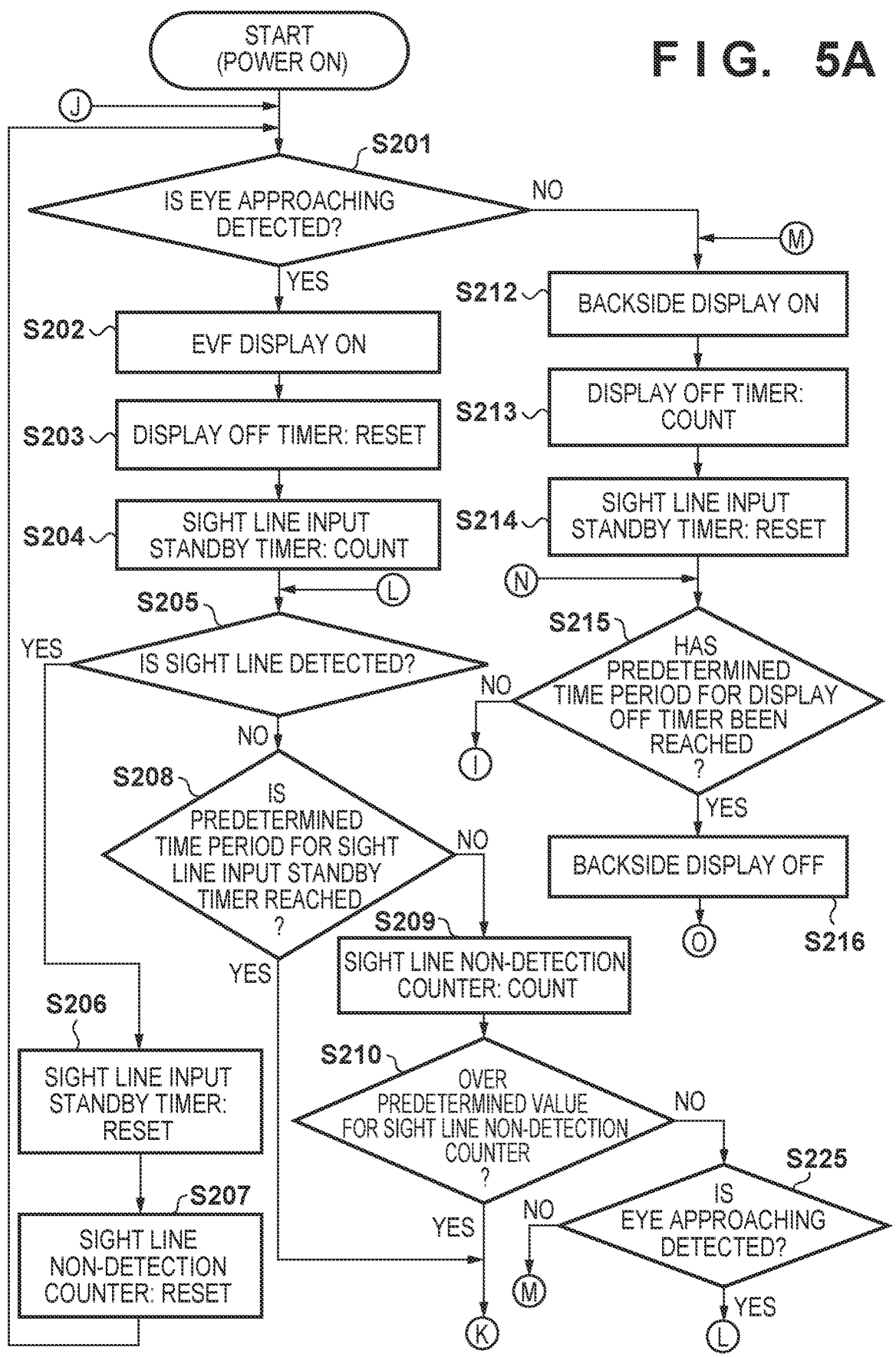
FIGS. 5A and 5B are flowcharts illustrating display control processing of the second embodiment.

FIGS. 5A and 3B are flowcharts illustrating processing for using the eye approach detection function and the sight line detection function to control the EVF 229 or the backside display unit 101, in the second embodiment. Note that, points of difference from FIGS. 3A, 3B, 4A and 4B are primarily described below.

Step S201 to step S206 and step S211 to S225 are similar to step S101 to step S106 and step S108 to S125 of FIGS. 3A and 3B.

In step S207, the system control unit 201 resets the count value of a sight line non-detection counter. The sight line non-detection counter is a counter for counting a number of times (a count value) that a state where a sight line is not detected is entered (a sight line detection notification is not received from the sight-line detection unit 260) each time sight line detection is performed after counting of the sight line input standby timer is started during display of the EVF 229. The sight line input standby timer is counted only while the EVF 229 is being displayed, and is reset when the EVF 229 is turned off. In relation to this, the sight line non-detection counter is counted only while the EVF 229 is being displayed, and is held while the EVF 229 is turned off. In addition, it is enabled until the sight-line detection unit 260 detects a sight line.

In step S208, the system control unit 201 determines whether the count value of the sight line input standby timer for which counting started in step S204 has exceeded a predetermined threshold, and if the predetermined threshold is exceeded it is determined that a user is not looking through the EVF 229 and the processing proceeds to step S211, and if the predetermined threshold is not exceeded the processing proceeds to step S209.

In step S209, the system control unit 201 increments the count value of a sight line non-detection counter.

In step S210, the system control unit 201 determines whether the count value of the sight line non-detection counter for which counting started in step S209 has exceeded a predetermined threshold, and if the predetermined threshold is exceeded it is determined that a user is not looking through the EVF 229 and the processing proceeds to step S211, and if the predetermined threshold is not exceeded the processing proceeds to step S225.

Figure 5B:
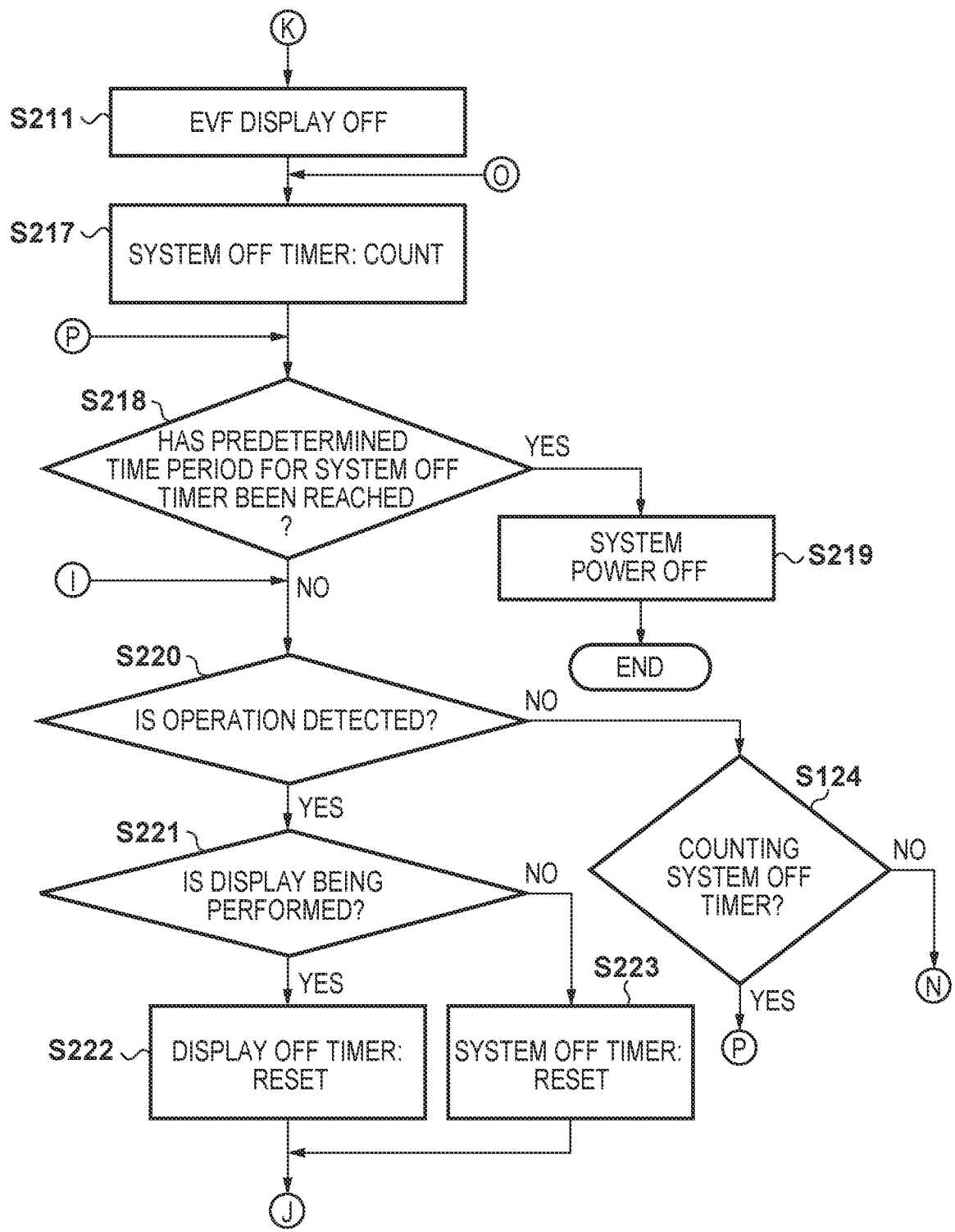
Figure 6A:
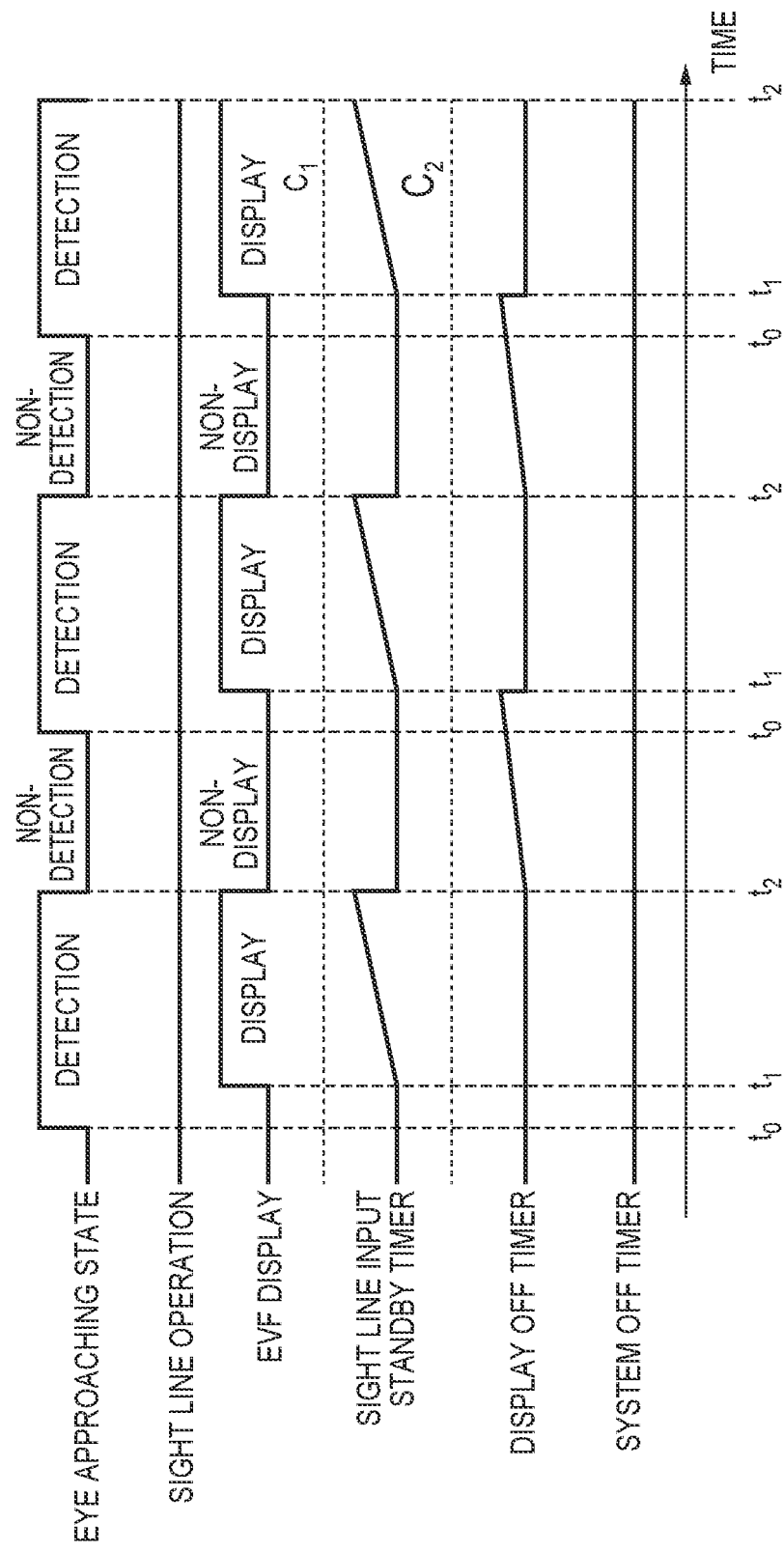

FIGS. 6A and 6B are timing charts indicating operation relationships between each unit and the EVF 229 that using the eye approach detection function and the sight line detection function when the processing of FIGS. 5A and 5B is executed.

FIG. 6A illustrates an operation relation of each unit and the EVF 229 in a case where the processing of FIGS. 3A and 3B is performed when the eye approach detection unit 217 repeats detection and non-detection of an eye approaching, for example if a user moves while the digital camera 100 is hung from their neck and their body touches and separates from the eyepiece part 216.

At time t0, the digital camera 100 approaches or touches the body of the user and the eye approach detection unit 217 detects an eye approaching, and in response to this, at time t1, the system control unit 201 activates the EVF 229, and starts transmission of display data to the EVF 229 to start display of the EVF 229. At this time, counting of the sight line input standby timer which is set in step S104 of FIG. 3A starts, and simultaneously operation of the sight-line detection unit 260 is also started, but a state where a sight line cannot be detected is entered.

At time t1 and thereafter, the system control unit 201 is not receiving a sight line detection notification from the sight-line detection unit 260, and thus the count value of the sight line input standby timer continues to be incremented.

At time t2, when the eye approach detection unit 217 ceases to detect an eye approaching such as by the body of a user going away from the digital camera 100, the system control unit 201 stops display of the EVF 229, and simultaneously activates the backside display unit 101 and transmits display data to start display. At this point, the count value of the sight line input standby timer is in a state of not having reached the threshold C1 which indicates a time period for determining a state where a sight line is not detected during display of the EVF 229, and the count value of the sight line input standby timer is reset.

Subsequently, when a user moves for example, the digital camera 100 continues to move at small increments, and the state from time t0 to t2 is repeated. The eye approach detection unit 217 repeats detection and non-detection of an eye approaching, and thus repeats switching between display of the EVF 229 and display of the backside display unit 101.

In addition, there is a state where the count value of the display off timer set in step S10 of FIG. 3A has not reached the threshold C2 for determining a time period until there is a transition to a shooting state of the digital camera 100, and the count value of the display off timer is reset.

In this manner, the system control unit 201 is not able to stop transmission of display data and supply of power to the EVF 229 and the backside display unit 101, and power continues to be consumed without this being intended even in an unoperated state where a user is not operating the digital camera 100.

FIG. 6B illustrates an operation relation of each unit and the EVF 229 in a case where the processing of FIGS. 5A and 5B is performed when the eye approach detection unit 217 repeats detection and non-detection of an eye approaching, for example if a user moves while the digital camera 100 is hung from their neck and their body touches and separates from the eyepiece part 216.

At time t0, the digital camera 100 approaches or touches the body of the user and the eye approach detection unit 217 detects an eye approaching, and in response to this, at time t1, the system control unit 201 activates the EVF 229, and starts transmission of display data to the EVF 229 to start display of the EVF 229. At this time, counting of the sight line input standby timer which is set in step S204 of FIG. 5A starts, and simultaneously operation of the sight-line detection unit 260 is also started, but a state where a sight line cannot be detected is entered. At this point, counting is also started for the sight line non-detection counter which is set in step S209 of FIG. 5A.

At time t1 and thereafter, the system control unit 201 is not receiving a sight line detection notification from the sight-line detection unit 260, and thus the count value of the sight line input standby timer continues to be incremented.

At time t2, when the eye approach detection unit 217 ceases to detect an eye approaching such as by the body of a user going away from the digital camera 100, the system control unit 201 stops display of the EVF 229, and simultaneously activates the backside display unit 101 and transmits display data to start display. At this point, the count value of the sight line input standby timer is in a state of not having reached the threshold C1 which indicates a time period for determining a state where a sight line is not detected during display of the EVF 229, and the count value of the sight line input standby timer is reset. However, the count value of the sight line non-detection counter is held.

Subsequently, when a user moves for example, the digital camera continues to move at small increments, and the state from time t0 to t2 is repeated. The eye approach detection unit 217 repeats detection and non-detection of an eye approaching, and thus repeats switching of display of the EVF 229 and display of the backside display unit 101. At this time, the count values of the sight line input standby counter and the display off counter are reset similarly to FIG. 6A, but the count value of the sight line non-detection counter is incremented each instance of sight line detection processing (step S205) which has a predetermined time period (after eye approach detection (YES in step S201)).

At time t3, the count value of the sight line non-detection counter reaches a threshold C3 for determining a time period that a state of not being able to detect a sight line has continued despite displaying the EVF 229. At this time, the system control unit 201 determines that there is a state where a user is not looking through the EVF 229, and stops transmission of display data to the EVF 229 and supply of power to the EVF 229 to stop display to the EVF 229, without switching display to the backside display unit 101.

In addition, counting of the system off timer which is set in step S217 of FIG. 5B is started at time t3. If the unoperated state where a user is not operating the operation unit 270 or the touch panel 271 continues, the threshold C4 for determining a time for the system control unit 201 to transition to a sleep state is reached. Because of this, the system control unit 201 can transition to the sleep state.

As described above, the number of times it is determined that the eye approach detection unit 217 detects an eye approaching but the sight-line detection unit 260 does not detect a sight line during display of the EVF 229 is counted, and if this number of times exceeds a predetermined threshold, it can be determined that a user is not looking through the EVF 229. With this, it is possible to stop display of the EVF 229 in a case where a state where the EVF 229 is displayed but a user is not looking through the EVF 229 is continuing.

Note that description was given for an example of sight line detection in the present embodiment, but this may be detection of change of a sight line.

In addition, the thresholds for the sight line input standby timer set in step S104 of FIG. 3A in the first embodiment and the display off timer set in step S110 may be changed, for example, in response to a state of the camera 100 where the attitude detection unit 255 has detected that the camera 100 is being held in an upright position and the camera 100 is in a state of being downward or being upward. Similarly, thresholds for the sight line input standby timer set in step S204 of FIG. 5A of the second embodiment and the display off timer set in step S213, or the threshold for the sight line non-detection counter set in step S209 may be changed, for example, in response to a state of the camera 100 where the attitude detection unit 255 has detected that the camera 100 is being held in an upright position and the camera 100 is in a state of being downward or being upward.

In addition, configuration may be taken to, if the camera 100 is being held in an upright position, perform control to increase a threshold because a probability that it is hanging down from a neck is low, or, when the camera 100 is being downward, perform control to decrease a threshold because a probability that the EVF 229 is being looked through is low. In addition, if an eye approaching ceases to be detected within a predetermined amount of time after an eye approaching is detected, control may be performed to increase a threshold because there is a high probability that shooting will be performed again.

In addition, in the second embodiment, counting of the sight line non-detection counter may be executed once when the eye approach detection unit 217 detects an eye approaching and switches from display of the backside display unit 101 to display of the EVF 229, or counting may be continued while the eye approach detection unit 217 is detecting an eye approaching.

According to the present embodiment, it is possible to use the eye approach detection function and the sight line detection function to appropriately control display of an EVF or a display unit, and achieve a high power saving effect.

Note that the foregoing control described as something that the system control unit 201 performs may be performed by one piece of hardware, and a plurality of pieces of hardware may distribute processing to perform control of the entirety of the apparatus.

In addition, although the present disclosure was explained in detail based on suitable embodiments, the present disclosure is not limited to these specific embodiments, and various forms of a scope that does not deviate from the gist of this disclosure are included in the disclosure. Furthermore, the above-described embodiment is merely one embodiment of the present disclosure, and different embodiments can be combined as appropriate.

The foregoing embodiment describes an example of a case where the present disclosure is applied in a digital camera. However, the present disclosure is not limited to this example. The present disclosure can be applied to an apparatus having eye approach detection function and sight line detection function. In other words, the present disclosure can be applied in personal computers and PDAs, mobile telephone terminals and portable image viewers, printers having displays, digital photo frames, music players, game devices, e-book readers, tablet terminals, smartphones, projection apparatuses, household apparatuses, vehicle-mounted apparatuses, and so on having displays.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-124752, filed Jul. 3, 2019 which is hereby incorporated by reference herein in its entirety.

What is claimed is:

1. A display control apparatus comprising:
a first display;
an eye approach detector configured to detect an eye approaching to an eyepiece part;
a sight line detector configured to detect a sight line of the eye that is viewing the first display via the eyepiece part; and
a memory and at least one processor which function as:
a control unit configured to perform control to start display of the first display in response to the detection of the eye approaching by the eye approach detector even if the sight line is not detected by the sight line detector and to stop display of the first display if the sight line is not detected by the sight line detector before a first time period elapses after the eye approaching is detected by the eye approach detector.

2. The apparatus according to claim 1, further comprising a second display capable of being viewed without the eyepiece part,
wherein the first display is capable of being viewed via the eyepiece part, and the control unit performs control to start display of the first display if the eye approaching is detected by the eye approach detector, and start display of the second display if the eye approaching is not detected by the eye approach detector.

3. The apparatus according to claim 1, further comprising an operation unit configured to accept a user operation,
wherein the control unit performs control to stop display of the second display if a state continues for a second time period longer than the first time period where an operation with respect to the operation unit is not performed and the second display is displayed.

4. The apparatus according to claim 3, wherein the control unit performs control to cause the display control apparatus to transition to a sleep state if a state, where an operation with respect to the operation unit is not performed, continues for a third time period after display of the first display or the second display is stopped.

5. The apparatus according to claim 3, wherein, in a case where the operation unit includes a touch screen, the operation with respect to the operation unit includes an operation by touch on the touch screen.

6. The apparatus according to claim 1, wherein
the sight line detector performs a sight line detection each first predetermined time period, and
the control unit performs control to stop display of the first display irrespective of the first time period in a case where, when the eye approaching is detected by the eye approach detector and the first display is displayed, a number of times the sight line is not detected in the sight line detection is counted and the counted number of times exceeds a predetermined threshold.

7. The apparatus according to claim 6, further comprising an attitude detector configured to detect an attitude of the display control apparatus,
wherein the control unit changes the predetermined threshold in accordance with the attitude of the display control apparatus.

8. The apparatus according to claim 7, wherein the control unit performs control to increase the predetermined threshold if the attitude of the display control apparatus is determined to be an upright position.

9. The apparatus according to claim 1, further comprising an attitude detector configured to detect an attitude of the display control apparatus,
wherein the control unit changes the first time period in accordance with the attitude of the display control apparatus.

10. The apparatus according to claim 9, wherein the control unit performs control to lengthen the first time period if the attitude of the display control apparatus is determined to be an upright position.

11. The apparatus according to claim 9, wherein the control unit performs control to shorten the first time period if the attitude of the display control apparatus is determined to be downward.

12. The apparatus according to claim 9, wherein the control unit performs control to lengthen the first time period if, after the eye approaching is detected by the eye approach detector, the eye approaching ceases to be detected within a second predetermined time period.

13. A method of controlling a display control apparatus that has
a first display;
an eye approach detector configured to detect an eye approaching to an eyepiece part;
a sight line detector configured to detect a sight line of the eye that is viewing the first display via the eyepiece part, a memory and at least one processor the method comprising:
performing control to start display of the first display in response to the detection of the eye approaching by the eye approach detector even if the sight line is not detected by the sight line detector and to stop display of the first display if the sight line is not detected by the sight line detector before a first time period elapses after the eye approaching is detected by the eye approach detector.

14. A non-transitory computer-readable storage medium storing a program for causing a computer to execute as a display control apparatus comprising:
a first display;
an eye approach detector configured to detect an eye approaching to an eyepiece part;
a sight line detector configured to detect a sight line of the eye that is viewing the first display via the eyepiece part; and
a memory and at least one processor which function as:
a control unit configured to perform control to start display of the first display in response to the detection of the eye approaching by the eye approach detector even if the sight line is not detected by the sight line detector and to stop display of the first display if the sight line is not detected by the sight line detector before a first time period elapses after the eye approaching is detected by the eye approach detector.

* * * * *